(12) United States Patent
Switzer, III et al.

(10) Patent No.: US 11,733,442 B2
(45) Date of Patent: Aug. 22, 2023

(54) OPTICAL FILTER

(71) Applicant: VIAVI Solutions Inc., San Jose, CA (US)

(72) Inventors: James Switzer, III, Santa Rosa, CA (US); Georg J. Ockenfuss, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 162 days.

(21) Appl. No.: 17/248,061

(22) Filed: Jan. 7, 2021

(65) Prior Publication Data

US 2021/0124102 A1  Apr. 29, 2021

Related U.S. Application Data

(63) Continuation of application No. 16/371,692, filed on Apr. 1, 2019, now Pat. No. 10,901,127, which is a
(Continued)

(51) Int. Cl.
*G02B 5/28* (2006.01)
*G02B 6/44* (2006.01)
(Continued)

(52) U.S. Cl.
CPC .............. *G02B 5/288* (2013.01); *G02B 1/113* (2013.01); *G02B 1/115* (2013.01); *G02B 5/0816* (2013.01); *G02B 5/0825* (2013.01); *G02B 5/0833* (2013.01); *G02B 5/281* (2013.01); *G02B 6/02395* (2013.01); *G02B 6/4483* (2013.01); G02B 6/03616 (2013.01); G02F 1/0151 (2021.01)

(58) Field of Classification Search
CPC ........ G02B 5/288; G02B 1/113; G02B 1/115; G02B 5/0816; G02B 5/0825; G02B 5/0833; G02B 5/281; G02B 6/02395; G02F 1/0151
USPC .......................... 359/586, 584, 588, 589, 359
See application file for complete search history.

(56) References Cited

U.S. PATENT DOCUMENTS

| 4,684,565 A | 8/1987 | Abeles et al. |
| 4,740,442 A | 4/1988 | Waddell et al. |
| (Continued) | | |

FOREIGN PATENT DOCUMENTS

| CN | 1668961 A | 9/2005 |
| CN | 104471449 A | 3/2015 |
| (Continued) | | |

OTHER PUBLICATIONS

Extended European Search Report for Application No. EP21160006. 9, dated Jul. 29, 2021, 14 pages.
(Continued)

*Primary Examiner* — Audrey Y Chang
(74) *Attorney, Agent, or Firm* — Harrity & Harrity, LLP

(57) ABSTRACT

A bandpass filter may include a set of layers. The set of layers may include a first subset of layers. The first subset of layers may include hydrogenated germanium (Ge:H) with a first refractive index. The set of layers may include a second subset of layers. The second subset of layers may include a material with a second refractive index. The second refractive index may be less than the first refractive index.

20 Claims, 12 Drawing Sheets

Related U.S. Application Data continuation of application No. 15/657,515, filed on Jul. 24, 2017, now Pat. No. 10,247,865.

(51) Int. Cl.
| | | |
|---|---|---|
| *G02B 5/08* | (2006.01) | |
| *G02B 6/02* | (2006.01) | |
| *G02B 1/113* | (2015.01) | |
| *G02B 1/115* | (2015.01) | |
| *G02B 6/036* | (2006.01) | |
| *G02F 1/015* | (2006.01) | |

(56) References Cited

U.S. PATENT DOCUMENTS

| | | |
|---|---|---|
| 5,583,676 A | 12/1996 | Akiyama et al. |
| 9,354,369 B2 | 5/2016 | Hendrix |
| 10,247,865 B2 | 4/2019 | Switzer, III et al. |
| 10,901,127 B2 | 1/2021 | Switzer, III et al. |
| 2003/0072009 A1 | 4/2003 | Domash et al. |
| 2004/0207920 A1* | 10/2004 | Kitagawa ............... G02B 5/285 359/582 |
| 2005/0030628 A1 | 2/2005 | Wagner et al. |
| 2005/0078237 A1* | 4/2005 | Klaus ..................... G02F 1/292 349/98 |
| 2006/0285208 A1 | 12/2006 | Huang |
| 2011/0170164 A1* | 7/2011 | Wang ................. G02B 27/288 359/290 |
| 2012/0145901 A1 | 6/2012 | Kakiuchi et al. |
| 2016/0216419 A1 | 7/2016 | Sprague et al. |
| 2017/0186794 A1 | 6/2017 | Ockenfuss |

FOREIGN PATENT DOCUMENTS

| | | | |
|---|---|---|---|
| CN | 106199801 A | 12/2016 | |
| EP | 2872935 A2 | 5/2015 | |
| EP | 3187909 A1 | 7/2017 | |
| GB | 2175016 A | 11/1986 | |
| GB | 2201164 A | 8/1988 | |
| JP | 01108503 A * | 4/1989 | ............... G02B 5/28 |
| JP | H01108503 A | 4/1989 | |
| JP | H01246362 A | 10/1989 | |
| JP | H07120779 A | 5/1995 | |
| JP | 2004530928 A | 10/2004 | |
| JP | 2009503614 A | 1/2009 | |
| JP | 2017126742 A | 7/2017 | |
| KR | 20170078545 A | 7/2017 | |
| TW | 201721188 A | 6/2017 | |
| WO | 02103441 A1 | 12/2002 | |
| WO | 2007016070 A2 | 2/2007 | |
| WO | 2014014930 A2 | 1/2014 | |

OTHER PUBLICATIONS

Extended European Search Report for Application No. EP18184658.5, dated Dec. 10, 2018, 10 pages.

* cited by examiner

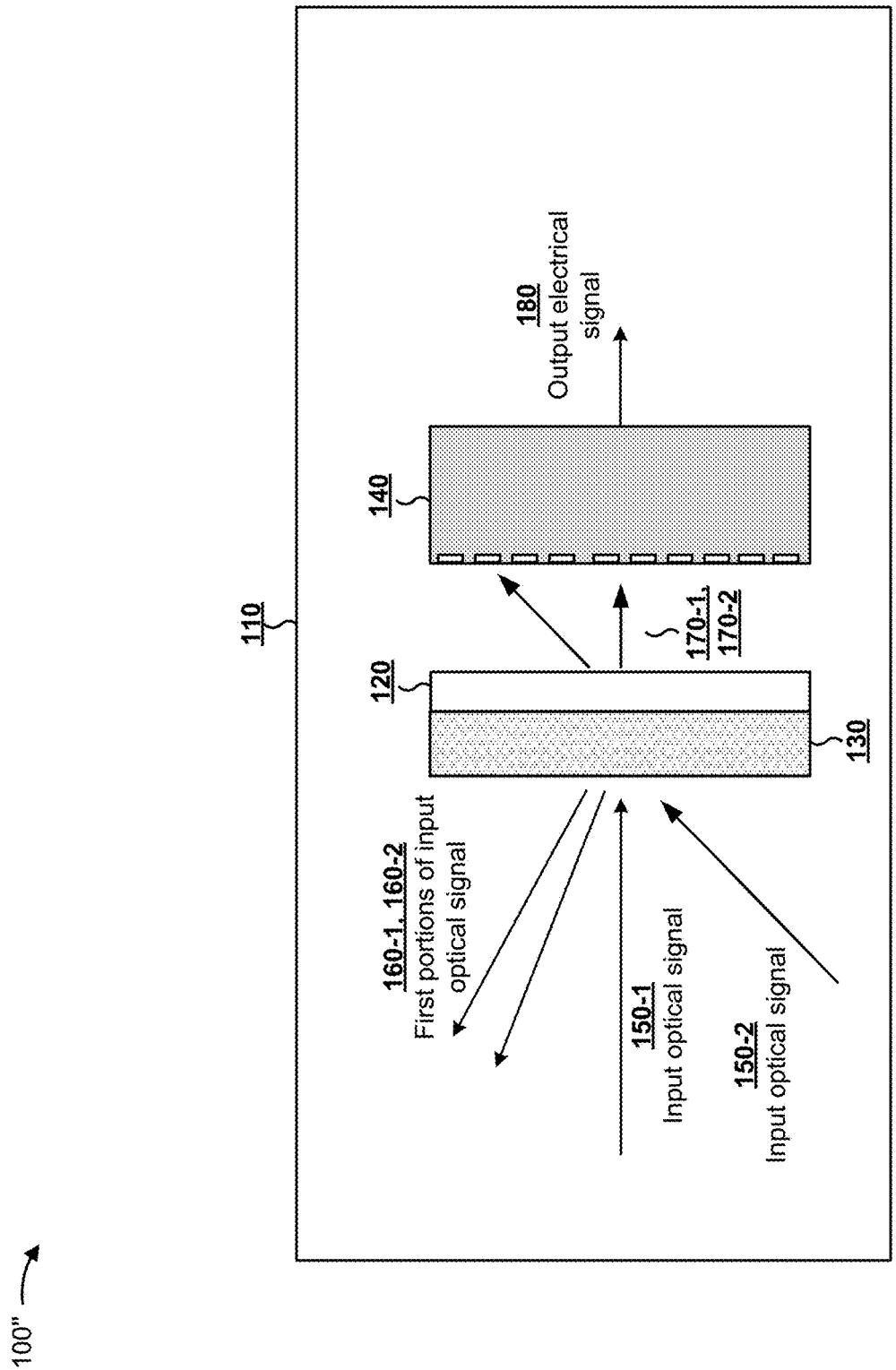

OPTICAL FILTER

RELATED APPLICATION

This application is a continuation of U.S. patent application Ser. No. 16/371,692, filed Apr. 1, 2019 (now U.S. Pat. No. 10,901,127), which is a continuation of U.S. patent application Ser. No. 15/657,515, filed Jul. 24, 2017 (now U.S. Pat. No. 10,247,865), which are incorporated herein by reference.

BACKGROUND

An optical sensor device may be utilized to capture information. For example, the optical sensor device may capture information relating to a set of electromagnetic frequencies. The optical sensor device may include a set of sensor elements (e.g., optical sensors, spectral sensors, and/or image sensors) that capture the information. For example, an array of sensor elements may be utilized to capture information relating to multiple frequencies. In one example, an array of sensor elements may be utilized to capture information regarding a particular spectral range, such as a spectral range of from approximately 1100 nanometers (nm) to approximately 2000 nm, another spectral range with a center wavelength of approximately 1550 nm, or the like. A sensor element, of the sensor element array, may be associated with a filter. The filter may include a passband associated with a first spectral range of light that is passed to the sensor element. The filter may be associated with blocking a second spectral range of light from being passed to the sensor element.

SUMMARY

According to some possible implementations, a bandpass filter may include a set of layers. The set of layers may include a first subset of layers. The first subset of layers may include hydrogenated germanium (Ge:H) with a first refractive index. The set of layers may include a second subset of layers. The second subset of layers may include a material with a second refractive index. The second refractive index may be less than the first refractive index.

According to some possible implementations, an optical filter may include a substrate. The optical filter may include a set of alternating high refractive index layers and low refractive index layers disposed onto the substrate to filter incident light. The optical filter may be configured to pass a first portion of the incident light within a spectral range with a center wavelength of approximately 1550 nanometers (nm) and reflect a second portion of incident light not within the spectral range. The high refractive index layers may be hydrogenated germanium (Ge:H). The low refractive index layers may be silicon dioxide ($SiO_2$).

According to some possible implementations, an optical system may include an optical filter configured to filter an input optical signal and provide the filtered input optical signal. The input optical signal may include light from a first optical source and light from a second optical source. The optical filter may include a set of dielectric thin film layers. The set of dielectric thin film layers may include a first subset of layers of hydrogenated germanium with a first refractive index. The set of dielectric thin film layers may include a second subset of layers of a material with a second refractive index less than the first refractive index. The filtered input optical signal may include a reduced intensity of light from the second optical source relative to the input optical signal. The optical system may include an optical sensor configured to receive the filtered input optical signal and provide an output electrical signal.

BRIEF DESCRIPTION OF THE DRAWINGS

FIGS. 1A-1C are diagrams of an overview of an example implementation described herein;

DETAILED DESCRIPTION

Figure 1A:
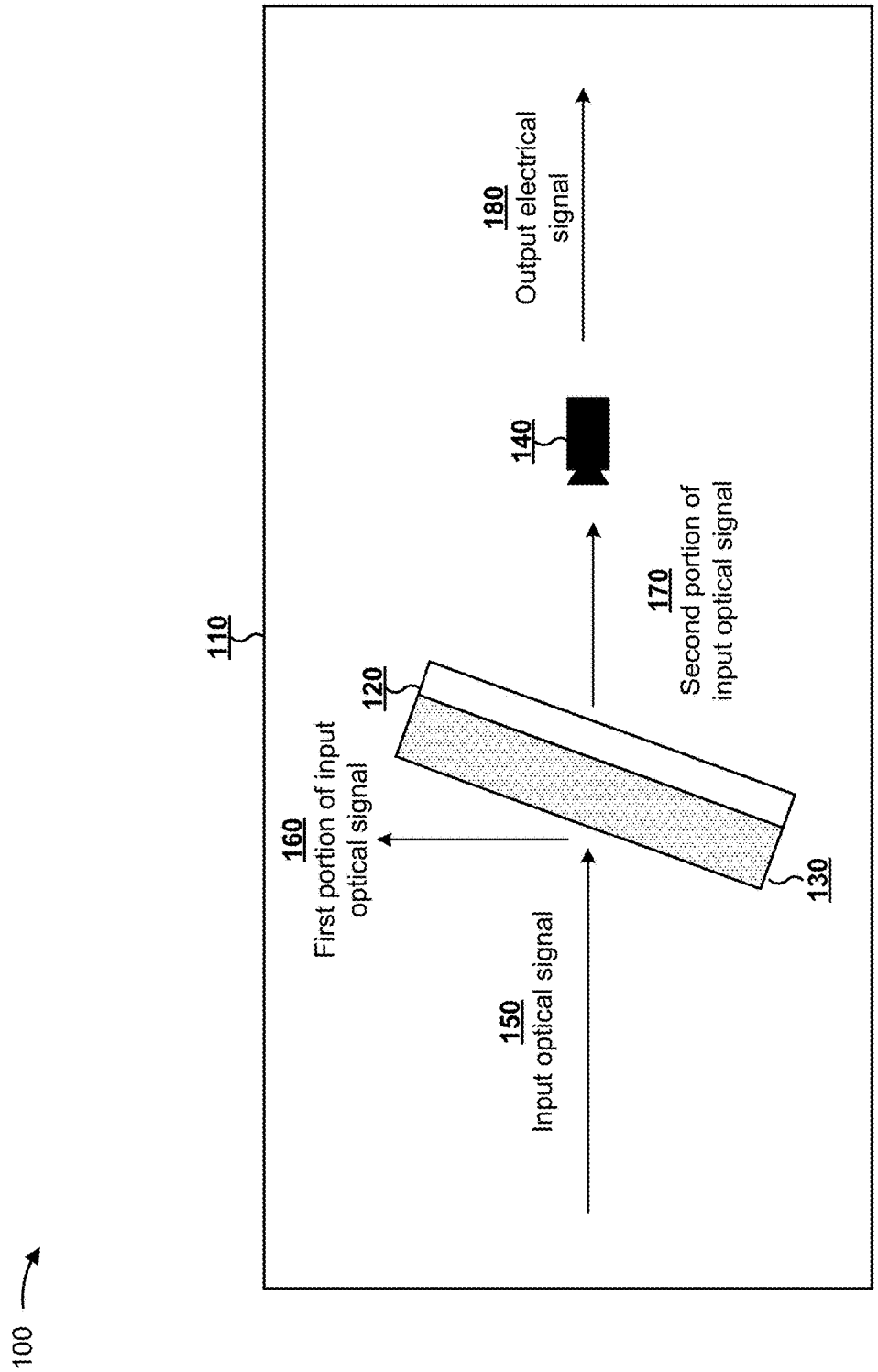

The following detailed description of example implementations refers to the accompanying drawings. The same reference numbers in different drawings may identify the same or similar elements.

An optical sensor device may include a sensor element array of sensor elements to receive light initiating from an optical source, such as an optical transmitter, a light bulb, an ambient light source, or the like. The optical sensor device may utilize one or more sensor technologies, such as a complementary metal-oxide-semiconductor (CMOS) technology, a charge-coupled device (CCD) technology, or the like. A sensor element (e.g., an optical sensor), of the optical sensor device, may obtain information (e.g., spectral data) regarding a set of electromagnetic frequencies. The sensor element may be an indium-gallium-arsenide (InGaAs) based sensor element, a silicon germanium (SiGe) based sensor element, or the like.

A sensor element may be associated with a filter that filters light to the sensor element to enable the sensor element to obtain information regarding a particular spectral range of electromagnetic frequencies. For example, the sensor element may be aligned with a filter with a passband in a spectral range of approximately 1100 nanometers (nm) to approximately 2000 nm, a spectral range of approximately 1500 nm to approximately 1600 nm, a spectral range with a center wavelength of approximately 1550 nm, or the like to cause a portion of light that is directed toward the sensor element to be filtered. A filter may include sets of dielectric layers to filter the portion of the light. For example, a filter may include dielectric filter stacks of alternating high index layers and low index layers, such as alternating layers of hydrogenated silicon (Si:H or SiH) or germanium (Ge) as a high index material and silicon dioxide ($SiO_2$) as a low index material. However, use of hydrogenated silicon as a high index material for a filter associated with a spectral range with a center wavelength centered at approximately 1550 nm may result in an excessive angle shift (e.g., an angle shift greater than a threshold). Moreover, use of germanium as a high index material may result in less than a threshold transmissivity for the passband centered at approximately 1550 nm, such as a transmissivity of less than approximate 20% at a wavelength of approximately 1550 nm.

Some implementations, described herein, provide an optical filter with hydrogenated germanium (Ge:H or GeH) as a high index material, thereby resulting in an angle-shift that is less than a threshold. For example, an optical filter may include one or more layers of hydrogenated germanium or annealed hydrogenated germanium and one or more layers of silicon dioxide to provide, for a passband centered at a wavelength of approximately 1550 nm, an angle shift of less than approximately 100 nm at an angle of incidence of 45 degrees, less than approximately 30 nm at an angle of incidence of 30 degrees, less than approximately 10 nm at an angle of incidence of 15 degrees, or the like. Moreover, the optical filter using hydrogenated germanium and/or annealed hydrogenated germanium may provide greater than a threshold level of transmissivity for a passband centered at approximately 1550 nm, such as a transmissivity greater than approximately 40%, greater than approximately 80%, greater than approximately 85%, or the like. In this way, some implementations described herein filter light with less than a threshold angle shift and with greater than a threshold level of transmission.

Figure 1B:
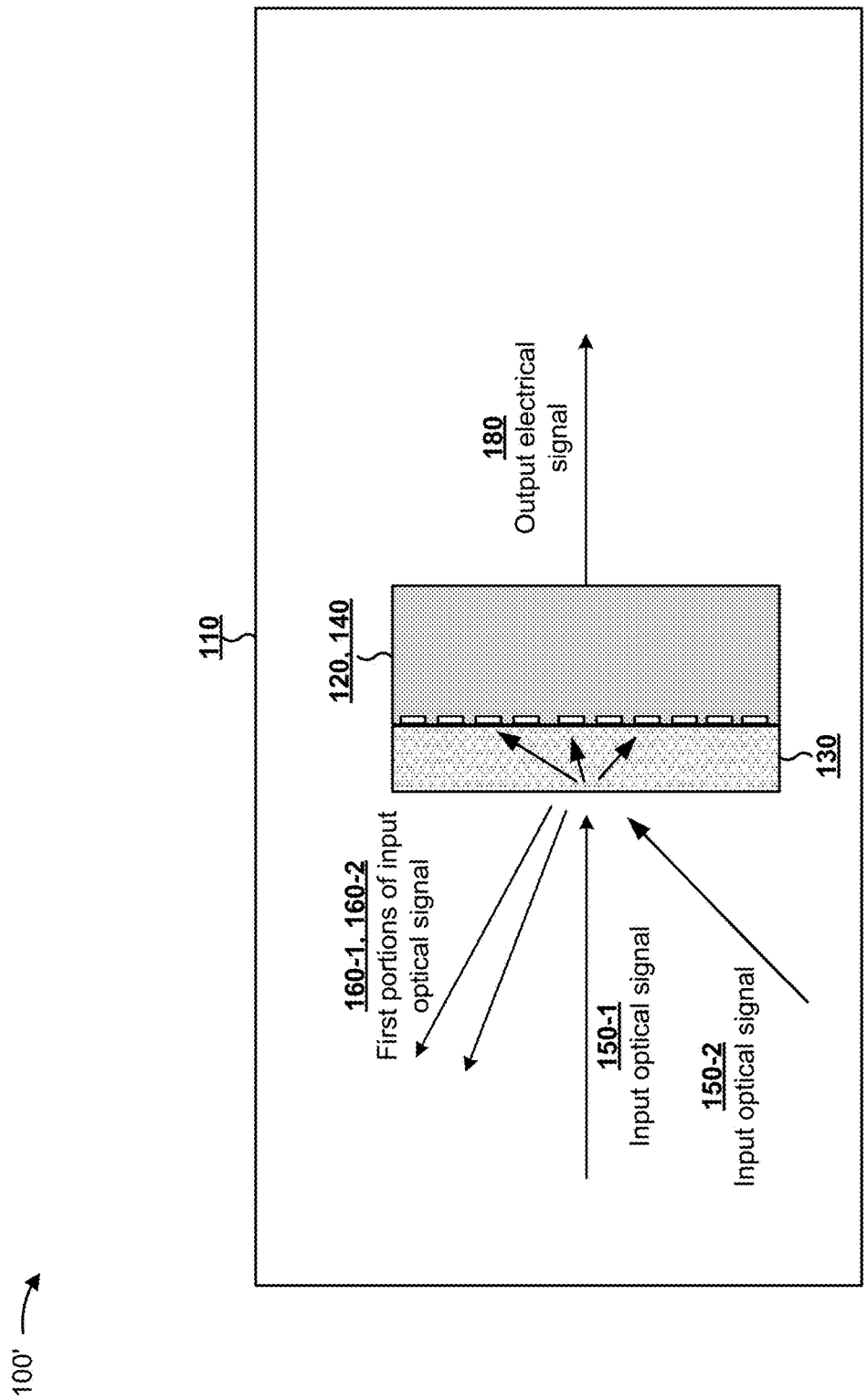

FIGS. 1A-1C are diagrams of an overview of example implementations 100/100'/100" described herein. As shown in FIG. 1A, example implementation 100 includes a sensor system 110. Sensor system 110 may be a portion of an optical system, and may provide an electrical output corresponding to a sensor determination. Sensor system 110 includes an optical filter structure 120, which includes an optical filter 130, and an optical sensor 140. For example, optical filter structure 120 may include an optical filter 130 that performs a passband filtering functionality. In another example, an optical filter 130 may be aligned to an array of sensor elements of optical sensor 140.

Although some implementations, described herein, may be described in terms of an optical filter in a sensor system, implementations described herein may be used in another type of system, may be used external to a sensor system, or the like.

As further shown in FIG. 1A, and by reference number 150, an input optical signal is directed toward optical filter structure 120. The input optical signal may include but is not limited to light associated with a particular spectral range (e.g., a spectral range centered at approximately 1550 nm), such as a spectral range of 1500 nm to 1600 nm, a spectral range of 1100 nm to 2000 nm, or the like. For example, an optical transmitter may direct the light toward optical sensor 140 to permit optical sensor 140 to perform a measurement of the light. In another example, the optical transmitter may direct another spectral range of light for another functionality, such as a testing functionality, a sensing functionality, a communications functionality, or the like.

As further shown in FIG. 1A, and by reference number 160, a first portion of the optical signal with a first spectral range is not passed through by optical filter 130 and optical filter structure 120. For example, dielectric filter stacks of dielectric thin film layers, which may include high index material layers and low index material layers of optical filter 130, may cause the first portion of light to be reflected in a first direction, to be absorbed, or the like. In this case, the first portion of light may be a threshold portion of light incident on optical filter 130 not included in a bandpass of optical filter 130, such as greater than 95% of light not within a particular spectral range centered at approximately 1550 nm. As shown by reference number 170, a second portion of the optical signal is passed through by optical filter 130 and optical filter structure 120. For example, optical filter 130 may pass through the second portion of light with a second spectral range in a second direction toward optical sensor 140. In this case, the second portion of light may be a threshold portion of light incident on optical filter 130 within a bandpass of optical filter 130, such as greater than 50% of incident light in a spectral range centered at approximately 1550 nm.

As further shown in FIG. 1A, based on the second portion of the optical signal being passed to optical sensor 140, optical sensor 140 may provide an output electrical signal 180 for sensor system 110, such as for use in imaging, ambient light sensing, detecting the presence of an object, performing a measurement, facilitating communication, or the like. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

As shown in FIG. 1B, another example implementation 100' includes a set of sensor elements of a sensor element array forming optical sensor 140 and integrated into a substrate of optical filter structure 120. In this case, optical filter 130 is disposed directly onto the substrate. Input optical signals 150-1 and 150-2 are received at multiple different angles and first portions 160-1 and 160-2 of input optical signals 150-1 and 150-2 are reflected at multiple different angles. In this case, second portions of input optical signals 150-1 and 150-2 are passed through optical filter 130 to a sensor element array forming optical sensor 140, which provides an output electrical signal 180.

As shown in FIG. 1C, another example implementation 100" includes a set of sensor elements of a sensor element array forming optical sensor 140 and separated from an optical filter structure 120 (e.g., by free space in a free space optics type of optical system). In this case, optical filter 130 is disposed onto optical filter structure 120. Input optical signals 150-1 and 150-2 are received at multiple different angles at optical filter 130. First portions 160-1 and 160-2 of the input optical signals 150-1 and 150-2 are reflected and second portions 170-1 and 170-2 of the input optical signals 150-1 and 150-2 are passed by optical filter 130 and optical filter structure 120. Based on receiving second portions 170-1 and 170-2, the sensor element array provides an output electrical signal 180.

As indicated above, FIGS. 1A-1C are provided merely as examples. Other examples are possible and may differ from what was described with regard to FIGS. 1A-1C.

Figure 2:
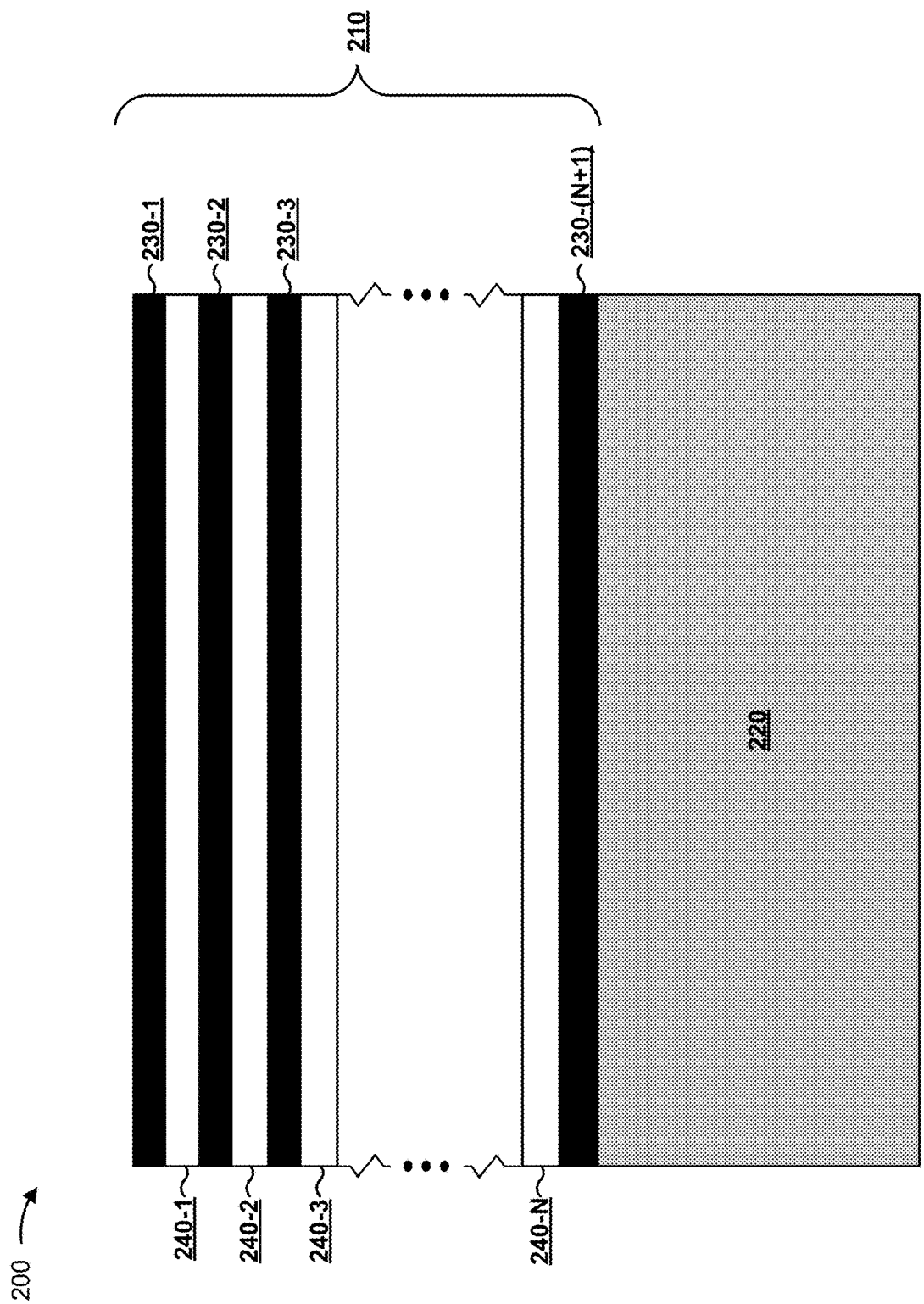
FIG. 2 is a diagram of a hydrogenated germanium based optical filter described herein.

FIG. 2 is a diagram of an example optical filter 200. FIG. 2 shows an example stackup of an optical filter using hydrogenated germanium as a high index material. As further shown in FIG. 2, optical filter 200 includes an optical filter coating portion 210 and a substrate 220.

Optical filter coating portion 210 includes a set of optical filter layers. For example, optical filter coating portion 210 includes a first set of layers 230-1 through 230-N (N≥1) (e.g., high refractive index layers (H layers)) and a second set of layers 240-1 through 240-(N+1) (e.g., low refractive index layers (L layers)). In some implementations, layers 230 and 240 may be arranged in a particular order, such as an $(H-L)_m$ (m≥1) order, an $(H-L)_m$-H order, an $(L-H)_m$ order, an L-$(H-L)_m$ order, or the like. For example, as shown, layers 230 and 240 are positioned in an $(H-L)_n$-H order with an H layer disposed at a surface of optical filter 200 and an H layer contiguous to a surface of substrate 220. In some implementations, one or more other layers may be included in optical filter 200, such as one or more protective layers, one or more layers to provide one or more other filtering functionalities (e.g., a blocker, an anti-reflection coating, etc.), or the like.

Layers 230 may include a set of hydrogenated germanium layers. In some implementations, another material may be utilized for the H layers, such as another material with a refractive index greater than the refractive index of the L layers, a refractive index greater than 2.0, a refractive index greater than 3.0, a refractive index greater than 4.0, a refractive index greater than 4.5, a refractive index greater the 4.6, or the like, over a particular spectral range (e.g., the spectral range of approximately 1100 nm to approximately 2000 nm, the spectral range of approximately 1400 nm to approximately 1600 nm, the wavelength of approximately 1550 nm, or the like). In another example, layers 230 may be selected to include a refractive index of approximately 4.2 at a wavelength of approximately 1550 nm.

In some implementations, a particular hydrogenated germanium based material may be selected for the H layers 230, such as hydrogenated germanium, annealed hydrogenated germanium, or the like. In some implementations, layers 230 and/or 240 may be associated with a particular extinction coefficient, such as an extinction coefficient, at approximately 1550 nm, of less than approximately 0.1, less than approximately 0.05, less than approximately 0.01, less than approximately 0.005, an extinction coefficient of less than approximately 0.001, an extinction coefficient of less than approximately 0.0008, or the like over a particular spectral range (e.g., the spectral range of approximately 800 nm to approximately 2300 nm, the spectral range of approximately 1100 nm to approximately 2000 nm, the wavelength of approximately 1550 nm, or the like).

Layers 240 may include a set of layers silicon dioxide ($SiO_2$) layers. In some implementations, another material may be utilized for the L layers. In some implementations, a particular material may be selected for L layers 240. For example, layers 240 may include a set of silicon dioxide ($SiO_2$) layers, a set of aluminum oxide ($Al_2O_3$) layers, a set of titanium dioxide ($TiO_2$) layers, a set of niobium pentoxide ($Nb_2O_5$) layers, a set of tantalum pentoxide ($Ta_2O_5$) layers, a set of magnesium fluoride ($MgF_2$) layers, or the like. In this case, layers 240 may be selected to include a refractive index lower than that of the layers 230 over, for example, a particular spectral range (e.g., the spectral range of approximately 1100 nm to approximately 2000 nm, the spectral range of approximately 1400 nm to approximately 1600 nm, the wavelength of approximately 1550 nm, or the like). For example, layers 240 may be selected to be associated with a refractive index of less than 3 over a particular spectral range (e.g., the spectral range of approximately 1100 nm to approximately 2000 nm, the spectral range of approximately 1400 nm to approximately 1600 nm, a spectral range of approximately 800 nm, the wavelength of approximately 1550 nm, or the like).

In another example, layers 240 may be selected to be associated with a refractive index of less than 2.5 over a particular spectral range (e.g., the spectral range of approximately 1100 nm to approximately 2000 nm, the spectral range of approximately 1400 nm to approximately 1600 nm, the wavelength of approximately 1550 nm, or the like). In another example, layers 240 may be selected to be associated with a refractive index of less than 2 over a particular spectral range (e.g., the spectral range of approximately 1100 nm to approximately 2000 nm, the spectral range of approximately 1400 nm to approximately 1600 nm, the wavelength of approximately 1550 nm, or the like). In another example, layers 240 may be selected to be associated with a refractive index of less than 1.5 over a particular spectral range (e.g., the spectral range of approximately 1100 nm to approximately 2000 nm, the spectral range of approximately 1400 nm to approximately 1600 nm, the wavelength of approximately 1550 nm, or the like). In some implementations, the particular material may be selected for layers 240 based on a desired width of an out-of-band blocking spectral range, a desired center-wavelength shift associated with a change of angle of incidence, or the like.

In some implementations, optical filter coating portion 210 may be associated with a particular quantity of layers, m. For example, a hydrogenated germanium based optical filter may include approximately 20 layers of alternating H layers and L layers. In another example, optical filter 200 may be associated with another quantity of layers, such as a range of 2 layers to 1000 layers, a range of 4 to 50 layers, or the like. In some implementations, each layer of optical filter coating portion 210 may be associated with a particular thickness. For example, layers 230 and 240 may each be associated with a thickness of between approximately 5 nm and approximately 2000 nm, resulting in optical filter coating portion 210 being associated with a thickness of between approximately 0.2 μm and 100 μm, a thickness of between approximately 0.5 μm and 20 μm, or the like.

In some implementations, layers 230 and 240 may be associated with multiple thicknesses, such as a first thickness for layers 230 and a second thickness for layers 240, a first thickness for a first subset of layers 230 and a second thickness for a second subset of layers 230, a first thickness for a first subset of layers 240 and a second thickness for a second subset of layers 240, or the like. In this case, a layer thickness and/or a quantity of layers may be selected based on an intended set of optical characteristics, such as an intended passband, an intended transmissivity, or the like. For example, the layer thickness and/or the quantity of layers may be selected to permit optical filter 200 to be utilized for a spectral range of approximately 1100 nm to approximately 2000 nm, at a center wavelength of approximately 1550 nm, or the like.

In some implementations, optical filter coating portion 210 may be fabricated using a sputtering procedure. For example, optical filter coating portion 210 may be fabricated using a pulsed-magnetron based sputtering procedure to sputter alternating layers 230 and 240 on a glass substrate. In some implementations, optical filter coating portion 210 may be associated with a relatively low center-wavelength shift with change in angle of incidence. For example, optical filter coating portion 210 may cause a center-wavelength shift of less than approximately 20 nm, less than approximately 15 nm, less than approximately 10 nm, or the like in magnitude with a change in incidence angle from 0 degrees to 15 degrees; a center-wavelength shift of less than approximately 100 nm, less than approximately 50 nm, less than approximately 30 nm, or the like with a change in incidence angle from 0 degrees to 30 degrees; a center-wavelength shift of less than approximately 200 nm, less than approximately 150 nm, less than approximately 125 nm, less than approximately 100 nm, or the like with a change in incidence angle from 0 degrees to 45 degrees; or the like.

In some implementations, optical filter coating portion 210 is attached to a substrate, such as substrate 220. For example, optical filter coating portion 210 may be attached to a glass substrate. In some implementations, optical filter coating portion 210 may be associated with an incident medium, such as an air medium or glass medium. In some implementations, optical filter 200 may be disposed between a set of prisms.

In some implementations, an annealing procedure may be utilized to fabricate optical filter coating portion 210. For example, after sputter deposition of layers 230 and 240 on a substrate, optical filter 200 may be annealed to improve one or more optical characteristics of optical filter 200, such as reducing an absorption coefficient of optical filter 200 relative to another optical filter for which an annealing procedure is not performed.

As indicated above, FIG. 2 is provided merely as an example. Other examples are possible and may differ from what was described with regard to FIG. 2.

Figure 3:
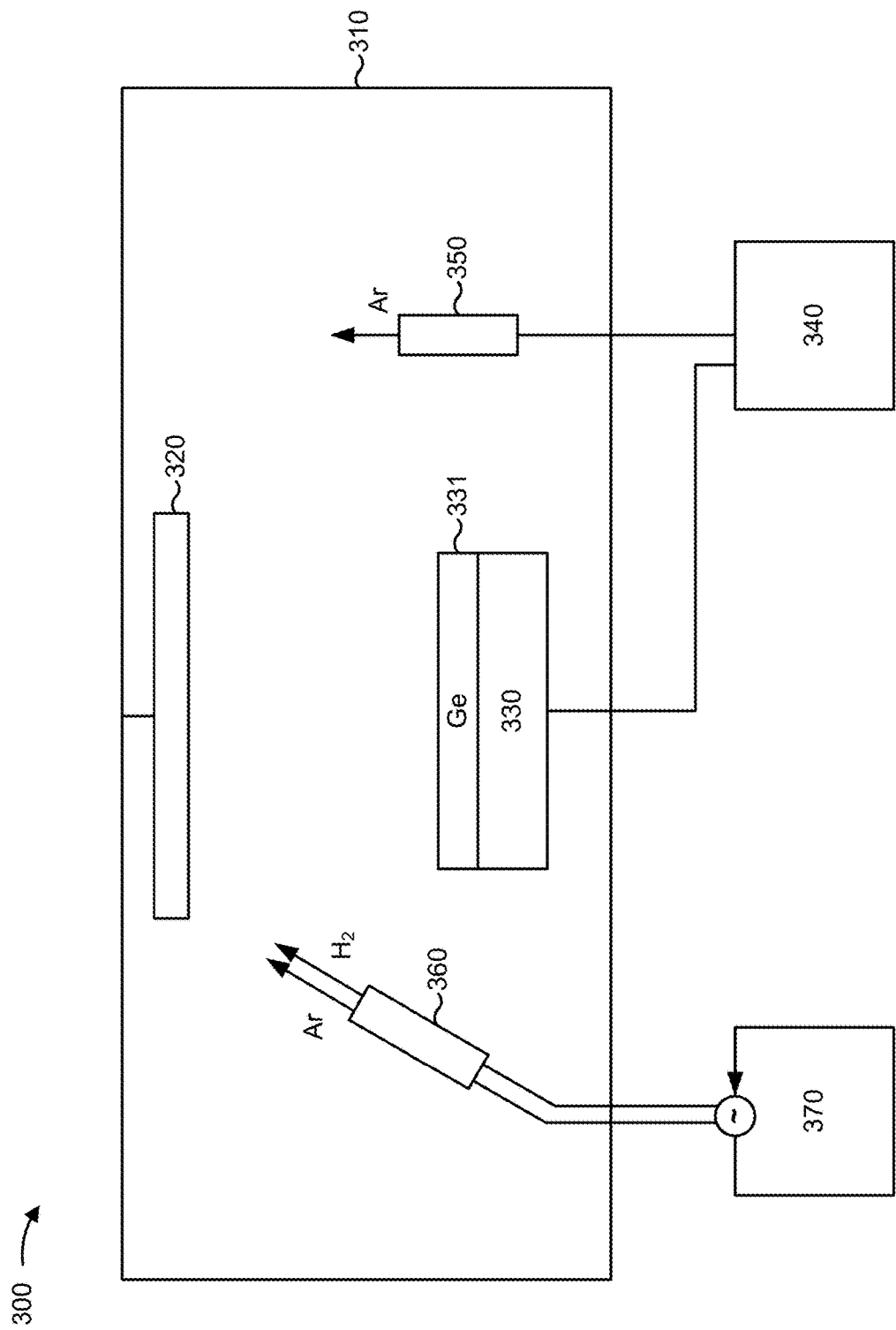
FIG. 3 is a diagram of a system for manufacturing a hydrogenated germanium based optical filter described herein.

FIG. 3 is diagram of an example 300 of a sputter deposition system for manufacturing a hydrogenated germanium based optical filter described herein.

As shown in FIG. 3, example 300 includes a vacuum chamber 310, a substrate 320, a cathode 330, a target 331, a cathode power supply 340, an anode 350, a plasma activation source (PAS) 360, and a PAS power supply 370. Target 331 may include a germanium material. PAS power supply 370 may be utilized to power PAS 360 and may include a radio frequency (RF) power supply. Cathode power supply 340 may be utilized to power cathode 330 and may include a pulsed direct current (DC) power supply.

With regard to FIG. 3, target 331 is sputtered in the presence of hydrogen ($H_2$), as well as an inert gas, such as argon, to deposit a hydrogenated germanium material as a layer on substrate 320. The inert gas may be provided into the chamber via anode 350 and/or PAS 360. Hydrogen is introduced into the vacuum chamber 310 through PAS 360, which serves to activate the hydrogen. Additionally, or alternatively, cathode 330 may cause hydrogen activation (e.g., in this case, hydrogen may be introduced from another part of vacuum chamber 310) or anode 350 may cause hydrogen activation (e.g., in this case, hydrogen may be introduced into vacuum chamber 310 by anode 350). In some implementations, the hydrogen may take the form of hydrogen gas, a mixture of hydrogen gas and a noble gas (e.g., argon gas), or the like. PAS 360 may be located within a threshold proximity of cathode 330, allowing plasma from PAS 360 and plasma from cathode 330 to overlap. The use of the PAS 360 allows the hydrogenated germanium layer to be deposited at a relatively high deposition rate. In some implementations, the hydrogenated germanium layer is deposited at a deposition rate of approximately 0.05 nm/s to approximately 2.0 nm/s, at a deposition rate of approximately 0.5 nm/s to approximately 1.2 nm/s, at a deposition rate of approximately 0.8 nm/s, or the like.

Although the sputtering procedure is described, herein, in terms of a particular geometry and a particular implementation, other geometries and other implementations are possible. For example, hydrogen may be injected from another direction, from a gas manifold in a threshold proximity to cathode 330, or the like. Although, described, herein, in terms of different configurations of components, different relative concentrations of germanium may also be achieved using different materials, different manufacturing processes, or the like.

As indicated above, FIG. 3 is provided merely as an example. Other examples are possible and may differ from what was described with regard to FIG. 3.

FIGS. 4A-4D show examples relating to optical filters using hydrogenated germanium as a high index material. FIGS. 4A-4D show characteristics relating to hydrogenated germanium based single layer films.

Figure 4A:
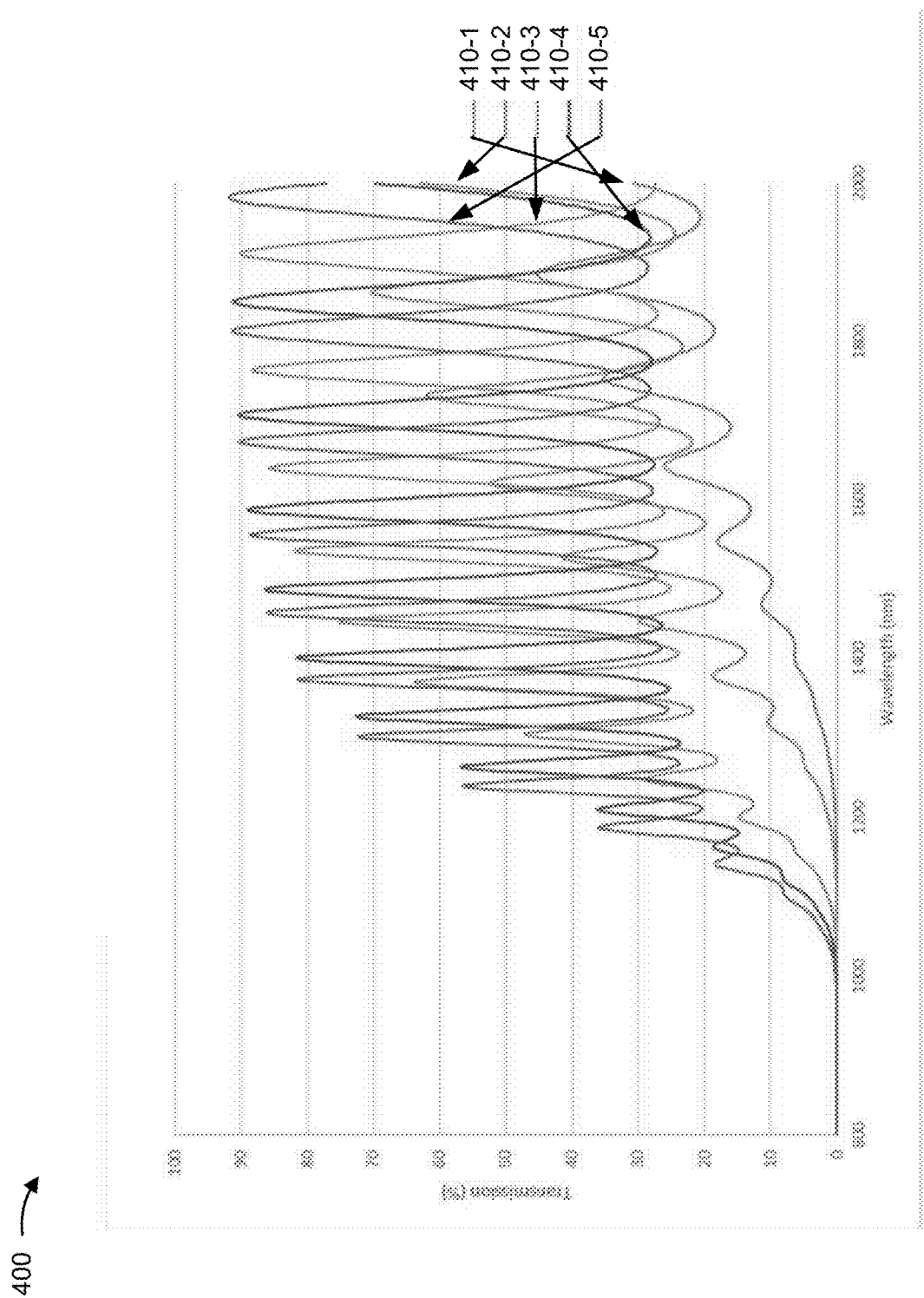
FIGS. 4A-4D are diagrams of characteristics relating to a hydrogenated germanium based optical filter described herein.

As shown in FIG. 4A, and by chart 400, a filter response showing transmissivity for a set of films 410-1 through 410-5 is provided. Each film 410 may be an approximately 2.5 micrometer single layer film. Film 410-1 is associated with a concentration of hydrogen associated with a flow rate of 0 standard cubic centimeters per minute (SCCM). In other words, film 410-1 uses non-hydrogenated germanium. Films 410-2, 410-3, 410-4, and 410-5 are associated with concentrations of hydrogen associated with flow rates of 20 SCCM, 100 SCCM, 160 SCCM, and 200 SCCM. In other words, films 410-2 through 410-5 use hydrogenated germanium with increasing concentrations of hydrogen. In this case, the hydrogenated germanium films, such as films 410-2 through 410-5, are associated with increased transmissivity relative to non-hydrogenated germanium film 410-1. In this way, utilizing hydrogenated germanium in an optical filter can provide improved transmissivity. For example, based on a concentration of hydrogen in a hydrogenated germanium film, a hydrogenated germanium film may be associated with as a transmissivity greater than 20%, greater than 40%, greater than 60%, greater than 80%, greater than 85%, greater than 90%, or the like for a spectral range of 1100 nm to 2000 nm, a spectral range of 1400 nm to 1600 nm, a spectral range with a wavelength of 1550 nm, or the like.

Figure 4B:
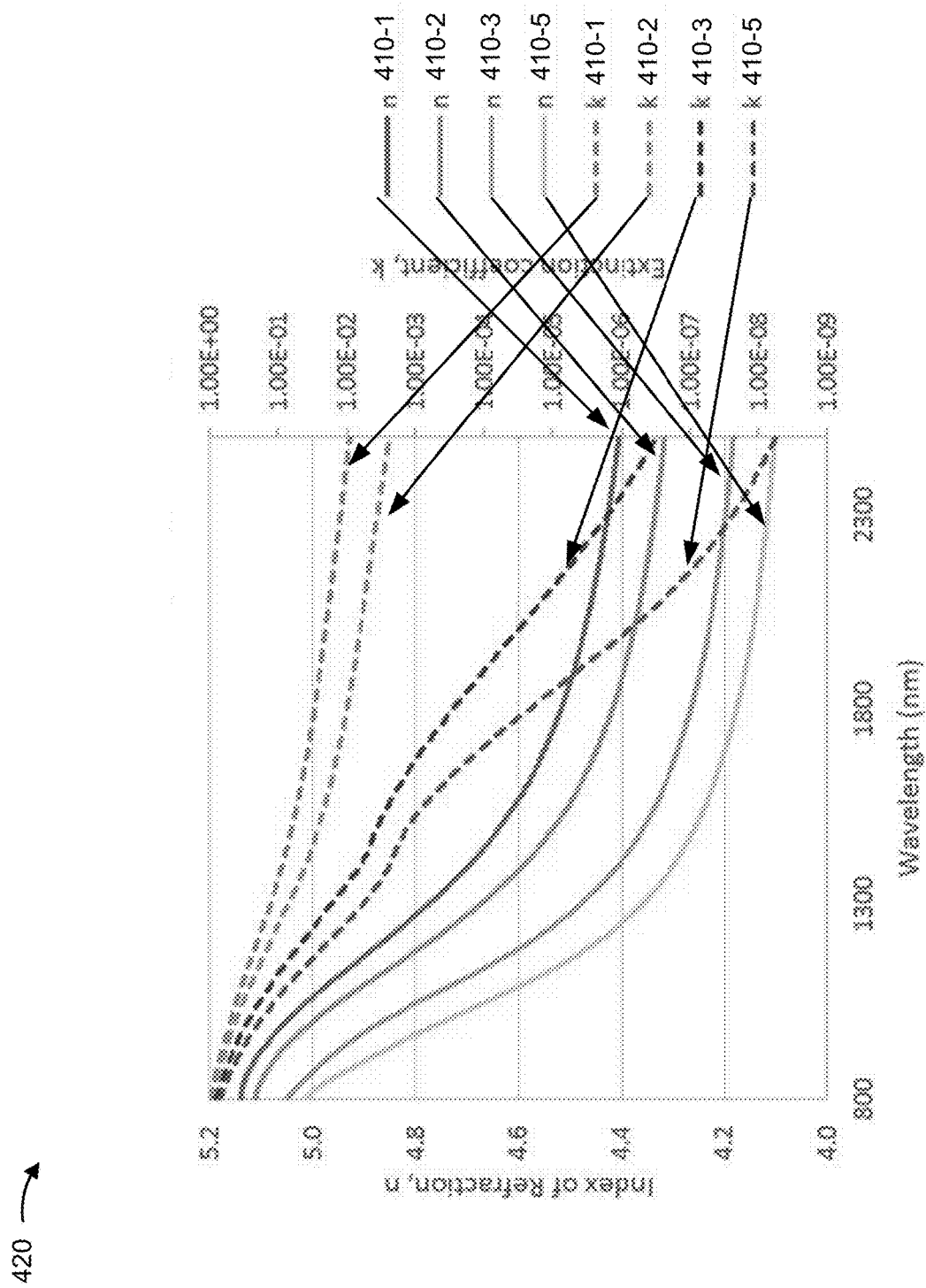

As shown in FIG. 4B, and by chart 420, an index of refraction and an extinction coefficient for the films 410 are provided. At a wavelength of 1400 nm, non-hydrogenated germanium film 410-1 is associated with an extinction coefficient of approximately 0.1, which is greater than the extinction coefficients for hydrogenated germanium films 410-2, 410-3, and 410-5, which are approximately 0.05, approximately 0.005, and approximately 0.002, respectively. Similarly, at a wavelength of 1400 nm, non-hydrogenated germanium film 410-1 is associated with a refractive index of 4.7, which compares with hydrogenated germanium films 410-2, 410-3, and 410-5, which are associated with refractive indices of 4.6, 4.4 and 4.3, respectively. In this case, hydrogenated-germanium films 410-2, 410-3, and 410-5 are associated with a reduced extinction coefficient while maintaining a threshold refractive index (e.g., greater than 4.0, greater than 4.2, greater than 4.4, greater than 4.5, etc.).

At a wavelength of 1550 nm, non-hydrogenated germanium film 410-1 is associated with an extinction coefficient of approximately 0.07, which is greater than the extinction coefficients for hydrogenated germanium films 410-2, 410-3, and 410-5, which are approximately 0.03, approximately 0.003, and approximately 0.001, respectively. Similarly, at a wavelength of 1550 nm, non-hydrogenated germanium film 410-1 is associated with a refractive index of 4.6, which compares with hydrogenated germanium films 410-2, 410-3, and 410-5, which are associated with refractive indices of 4.4, 4.3 and 4.2, respectively. In this case, hydrogenated-germanium films 410-2, 410-3, and 410-5 are associated with a reduced extinction coefficient while maintaining a threshold refractive index (e.g., greater than 4.0, greater than 4.2, greater than 4.4, etc.).

At a wavelength of 2000 nm, non-hydrogenated germanium film 410-1 is associated with an extinction coefficient of approximately 0.05, which is greater than the extinction coefficients for hydrogenated germanium films 410-2, 410-3, and 410-5, which are approximately 0.005, approximately 0.0005, and approximately 0.000001, respectively. Similarly, at a wavelength of 1550 nm, non-hydrogenated germanium film 410-1 is associated with a refractive index of 4.5, which compares with hydrogenated germanium films 410-2, 410-3, and 410-5, which are associated with refractive indices of 4.4, 4.2 and 4.1, respectively. In this case, hydrogenated-germanium films 410-2, 410-3, and 410-5 are associated with a reduced extinction coefficient while maintaining a threshold refractive index (e.g., greater than 3.5, greater than 3.75, greater than 4.0).

Figure 4C:
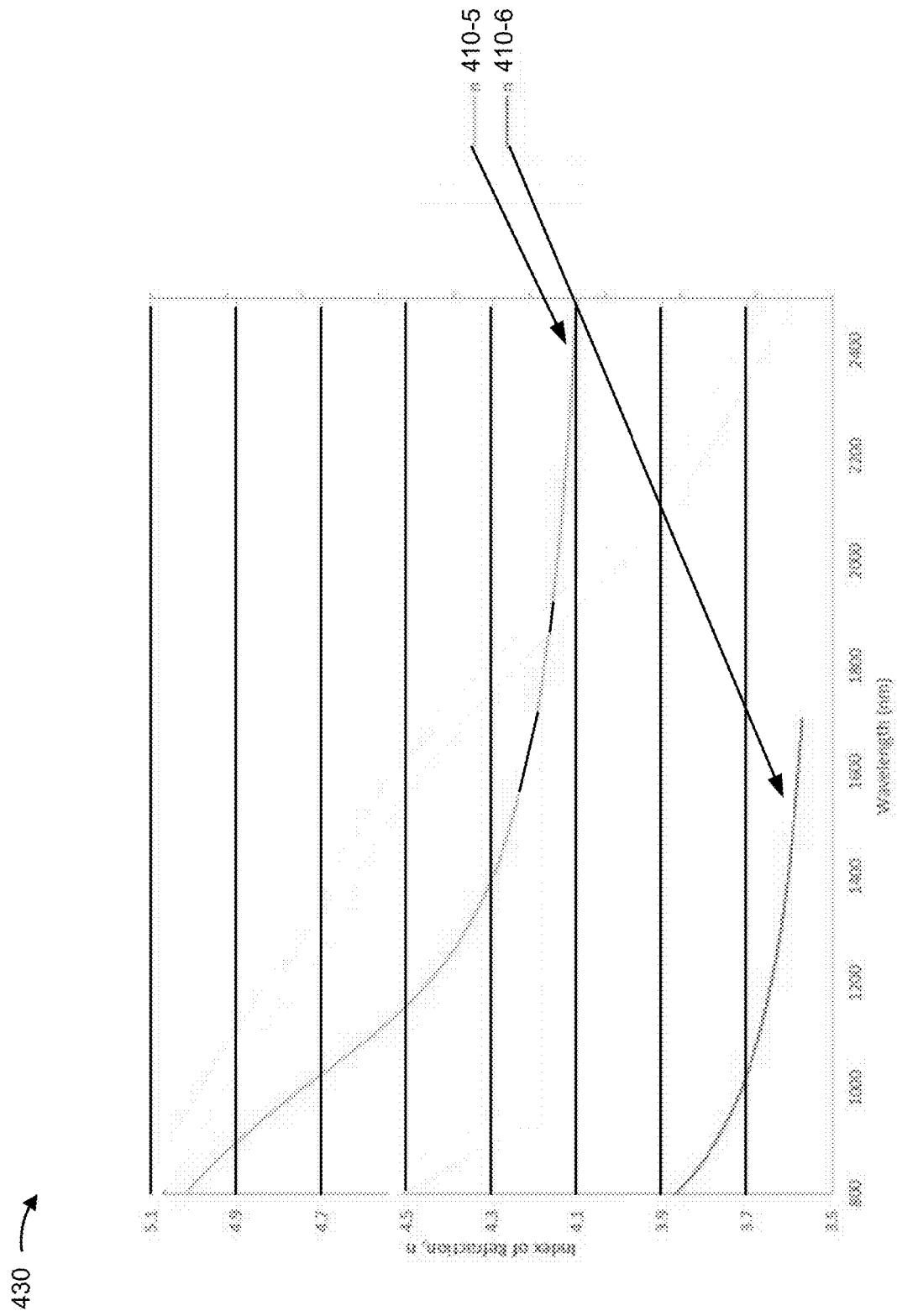

As shown in FIG. 4C, and by chart 430, an index of refraction for hydrogenated germanium film 410-5 and a hydrogenated silicon film 410-6 is provided. In this case, the index of refraction for hydrogenated germanium film 410-5 is each greater than an index of refraction for hydrogenated silicon film 410-6.

Figure 4D:
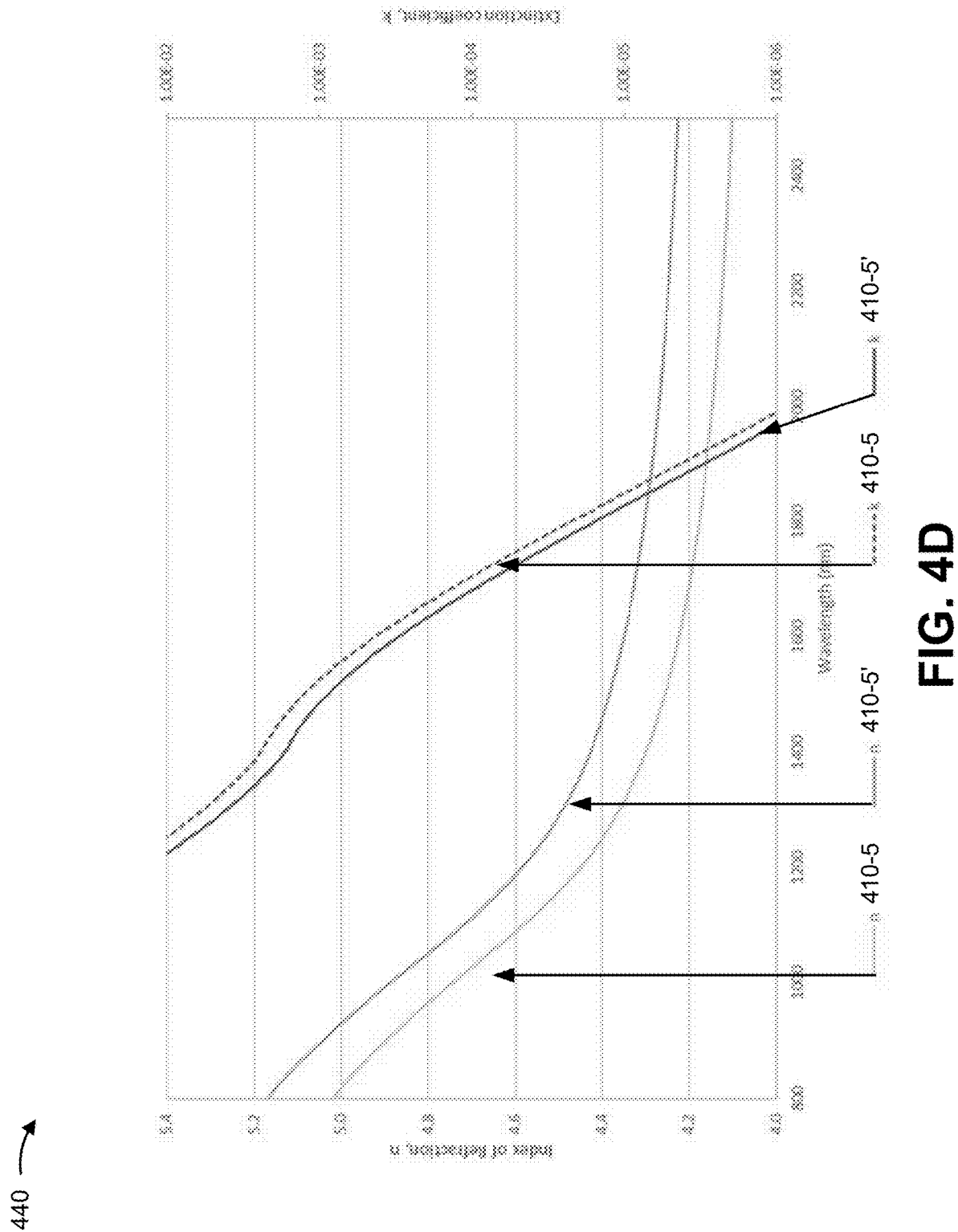

As shown in FIG. 4D, and by chart 440, an index of refraction and an extinction coefficient are provided for hydrogenated germanium film 410-5 and an annealed hydrogenated germanium film 410-5'. In this case, applying an annealing procedure, for example, at approximately 300 degrees Celsius for 60 minutes results in forming annealed hydrogenated germanium film 410-5', results in an increased index of refraction (e.g., increased to approximately 4.3) and a reduced extinction coefficient (e.g., reduced to approximately 0.0006) at a spectral range with a center wavelength of approximately 1550 nm relative to hydrogenated germanium film 410-5, thereby reducing angle shift and improving transmissivity.

As indicated above, FIGS. 4A-4D are provided merely as examples. Other examples are possible and may differ from what was described with regard to FIGS. 4A-4D.

Figure 5A:
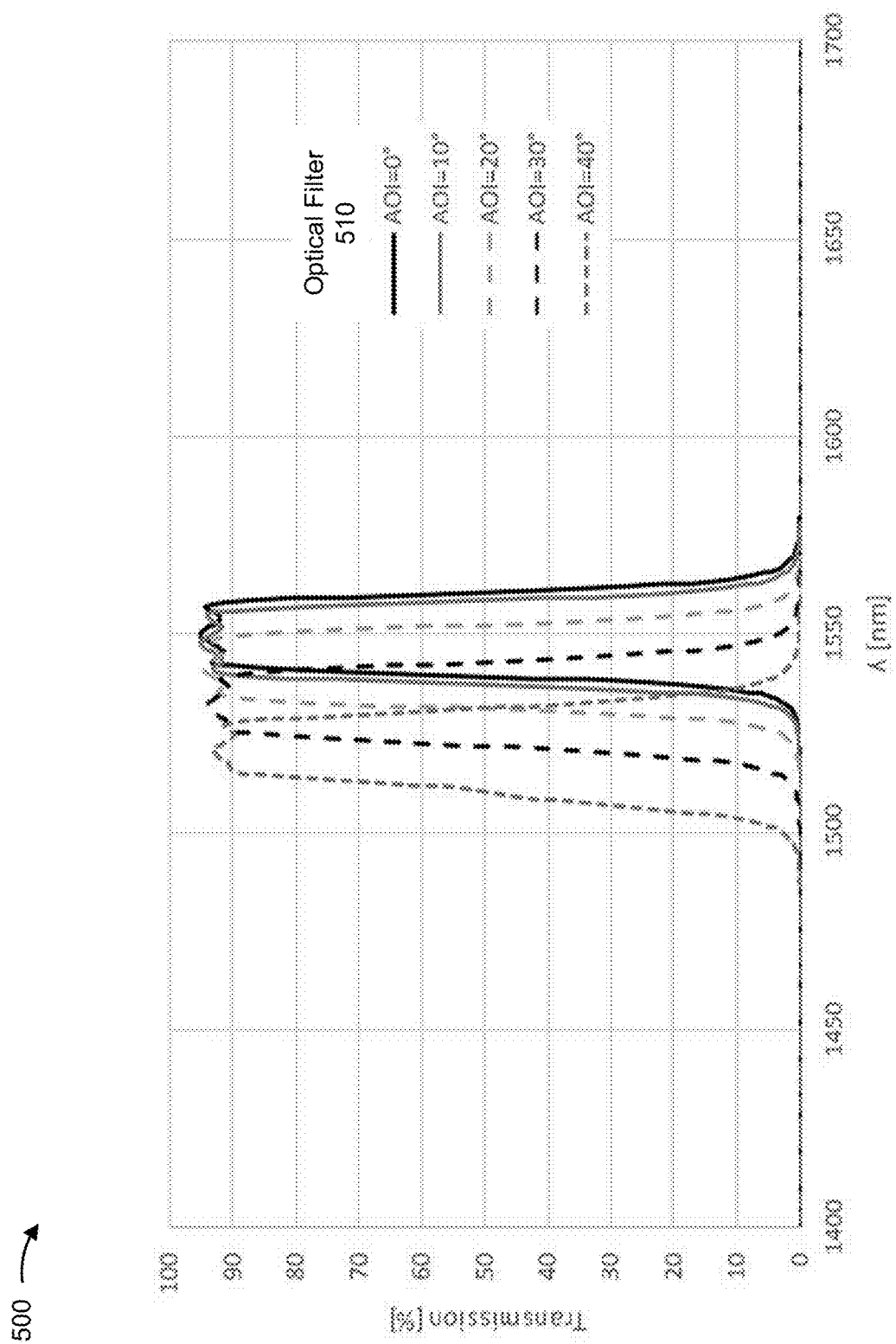
FIGS. 5A-5C are diagrams of characteristics relating to a hydrogenated germanium based optical filter described herein.
Figure 5B:
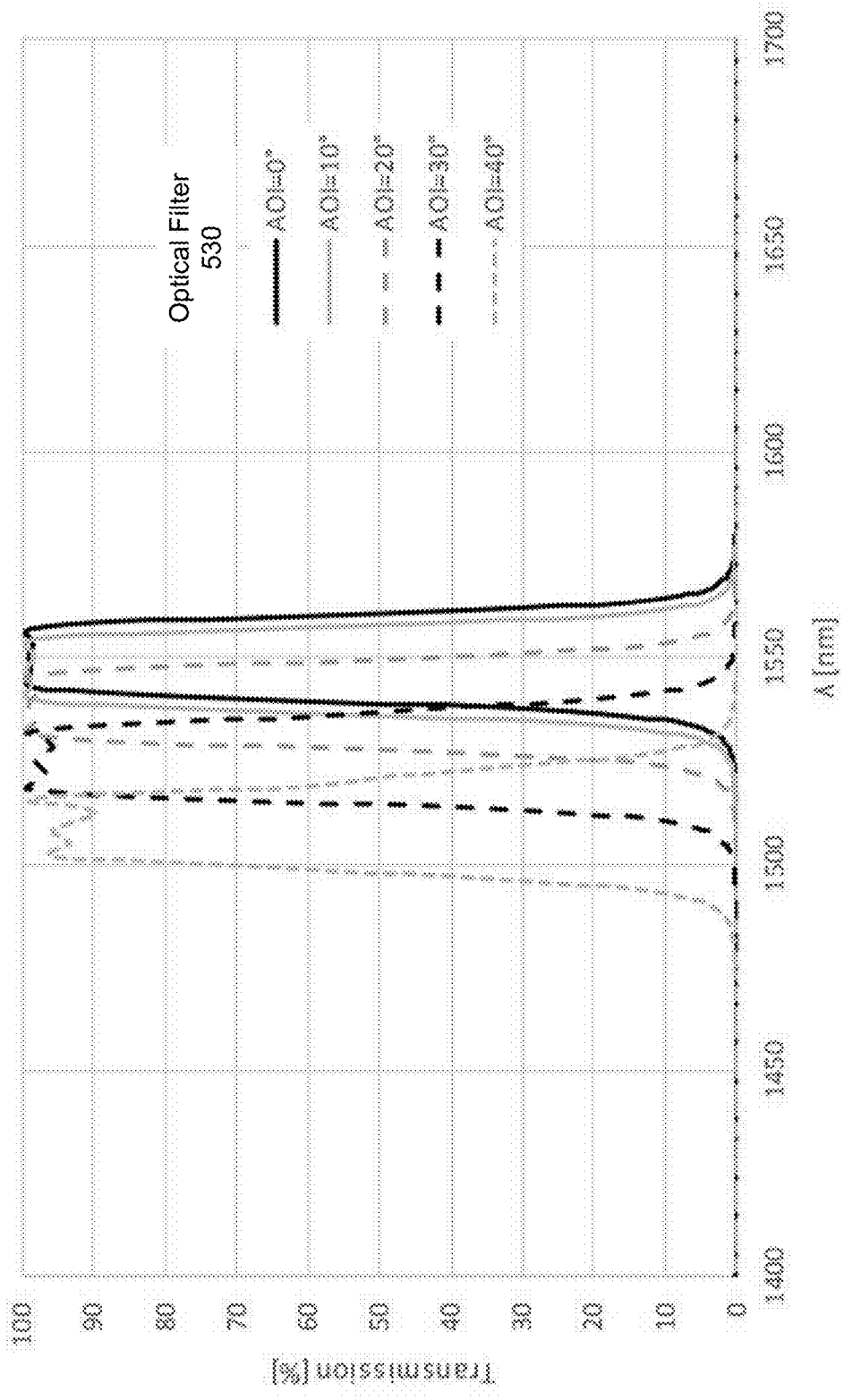
Figure 5C:
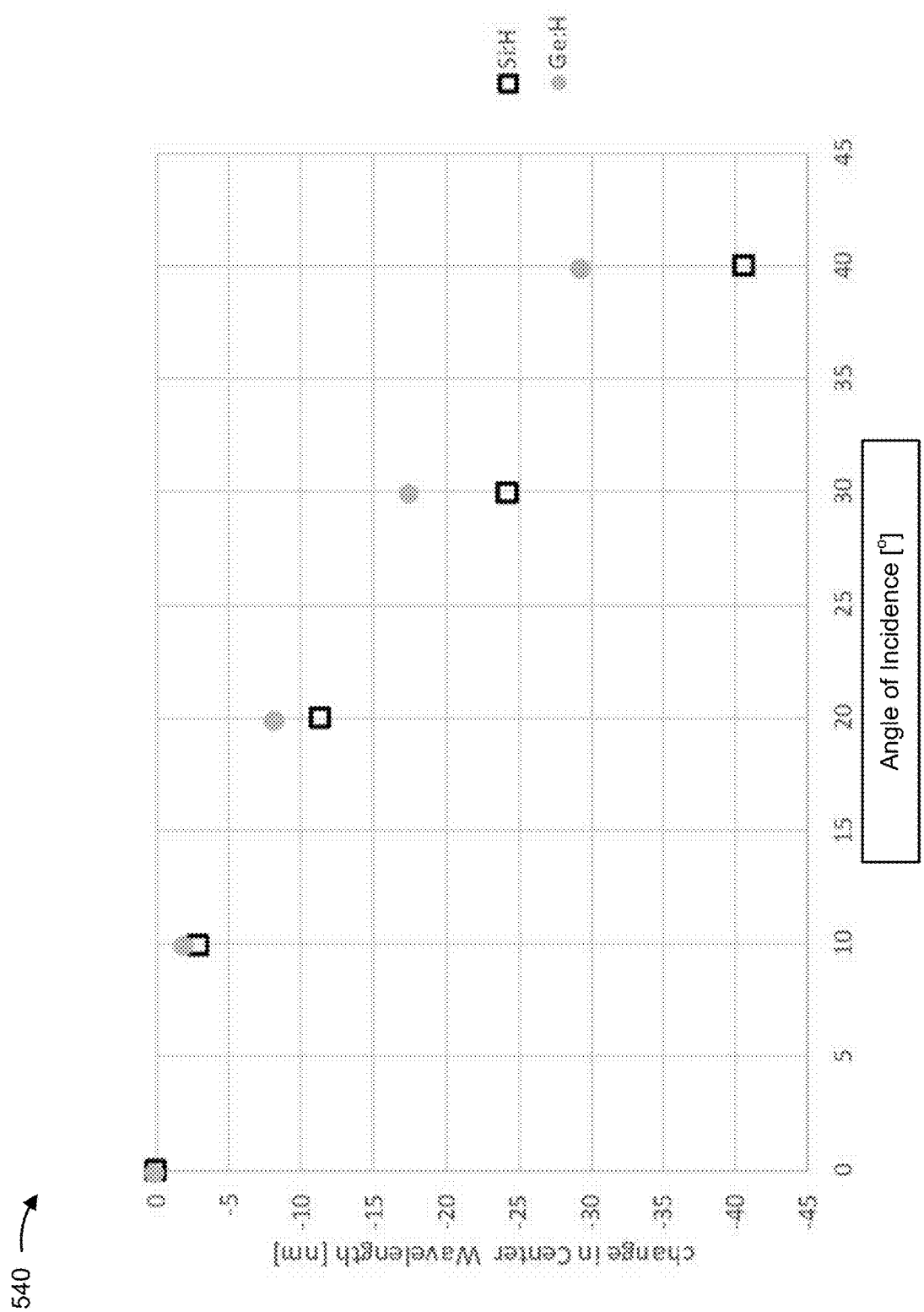

FIGS. 5A-5C are diagrams of characteristics relating to an optical filter. FIGS. 5A-5C show characteristics relating to bandpass filters.

As shown in FIG. 5A, and by chart 500, a filter response is provided for a hydrogenated germanium optical filter 510. Optical filter 510 may include alternating layers of hydrogenated germanium and silicon dioxide. In some implementations, optical filter 510 may be associated with a thickness of approximately 5.6 µm, and may be associated with a bandpass centered at approximately 1550 nm for an angle of incidence of 0 degrees. Moreover, optical filter 510 is associated with a transmissivity of greater than a threshold amount (e.g., greater than approximately 90%) for angles of incidence from 0 degrees to 40 degrees.

As shown in FIG. 5B, and by chart 520, a filter response is provided for a hydrogenated silicon based optical filter 530. Optical filter 530 may include alternating layers of hydrogenated silicon and silicon dioxide. In some implementations, optical filter 530 may be associated with a thickness of approximately 5.9 micrometers (µm) and may be associated with a bandpass centered at approximately 1550 nm for an angle of incidence of 0 degrees.

As shown in FIG. 5C, and by chart 540, relative to optical filter 510 (Si:Ge), optical filter 530 (Si:H) is associated with a reduced angle shift for changes of angles of incidence from 0 degrees to approximately 40 degrees. For example, optical filter 510 is associated with a change in center wavelength of, for example, less than approximately 5 nm at an angle of incidence of approximately 0-10 degrees, less than approximately 4 nm at an angle of incidence of approximately 0-10 degrees, less than approximately 3 nm at an angle of incidence of approximately 0-10 degrees, less than approximately 2 nm at an angle of incidence of approximately 0-10 degrees, or the like. Similarly, optical filter 510 is associated with a change in center wavelength of, for example, less than approximately 15 nm at an angle of incidence of 10-20 degrees, less than approximately 10 nm at an angle of incidence of 10-20 degrees, less than approximately 9 nm at an angle of incidence of 10-20 degrees, less than approximately 8 nm at an angle of incidence of 10-20 degrees, or the like.

Similarly, optical filter 510 is associated with a change in center wavelength of, for example, less than approximately 8 nm at an angle of incidence of 20 degrees, less than approximately 9 nm at an angle of incidence of 20 degrees, less than approximately 30 nm at an angle of incidence of 20-30 degrees, less than approximately 20 nm at an angle of incidence of 20-30 degrees, less than approximately 15 nm at an angle of incidence of 20-30 degrees, less than approximately 10 nm at an angle of incidence of 20-30 degrees, or the like. Similarly, optical filter 510 is associated with a change in center wavelength of, for example, less than approximately 40 nm at an angle of incidence of approximately 30-40 degrees, less than approximately 35 nm at an angle of incidence of approximately 30-40 degrees, less than approximately 30 nm at an angle of incidence of approximately 30-40 degrees, less than approximately 25 nm at an angle of incidence of approximately 30-40 degrees, less than approximately 20 nm at an angle of incidence of approximately 30-40 degrees, or the like.

As indicated above, FIGS. 5A-5C are provided merely as examples. Other examples are possible and may differ from what was described with regard to FIGS. 5A-5C.

In this way, a hydrogenated germanium optical filter, such as an optical filter with hydrogenated germanium as a high index layer and another material as a low index layer, may provide improved angel shift, improved transmissivity, and reduced physical thickness relative to other materials for an optical filter associated with a spectral range with a center wavelength at approximately 1550 nm.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical filter, comprising:
   one or more first layers, and one or more second layers,
  wherein the one or more first layers and the one or more second layers are configured to provide an angle shift of less than approximately 100 nanometers (nm) at an angle of incidence of 45 degrees or less than approximately 30 nm at an angle of incidence of 30 degrees, and
  wherein the one or more first layers include one or more layers of annealed hydrogenated germanium.

2. The optical filter of claim 1, wherein the one or more first layers further include one or more layers of hydrogenated germanium.

3. The optical filter of claim 1, wherein the one or more second layers include one or more layers of silicon dioxide.

4. The optical filter of claim 1, wherein the one or more first layers provide a transmissivity greater than approximately 40% for a passband centered at a wavelength of approximately 1550 nm.

5. The optical filter of claim 1, wherein the one or more first layers are further configured to provide a transmissivity greater than approximately 80% for a passband centered at a wavelength of approximately 1550 nm.

6. The optical filter of claim 1, wherein the one or more first layers are further configured to provide a transmissivity greater than approximately 85% for a passband centered at a wavelength of approximately 1550 nm.

7. The optical filter of claim 1, wherein the one or more first layers and the one or more second layers are configured to provide the angle shift of less than approximately 100 nm at the angle of incidence of 45 degrees or less than approximately 30 nm at the angle of incidence of 30 degrees for a passband centered at a wavelength of approximately 1550 nm.

8. An optical filter, comprising:
  one or more first layers with a first refractive index,
    the one or more first layers comprising a hydrogenated germanium film with an extinction coefficient of less than 0.001 at a spectral range with a center wavelength of approximately 1550 nanometers (nm), and
    the hydrogenated germanium film being an annealed hydrogenated germanium film; and
  one or more second layers with a second refractive index.

9. The optical filter of claim 8, wherein the second refractive index is less than the first refractive index.

10. The optical filter of claim 8, wherein the extinction coefficient is approximately 0.0006.

11. The optical filter of claim 8, wherein the hydrogenated germanium film has an index of refraction of approximately 4.3.

12. The optical filter of claim 8, wherein the hydrogenated germanium film is an approximately 2.5 micrometer single layer film.

13. The optical filter of claim 8, wherein the one or more first layers further comprise a non-hydrogenated germanium film.

14. The optical filter of claim 13, wherein the non-hydrogenated germanium film is associated with an extinction coefficient of approximately 0.07 and a refractive index of 4.6 at the spectral range with the center wavelength of approximately 1550 nm.

15. The optical filter of claim 8, wherein the one or more first layers further comprise one or more other hydrogenated germanium films.

16. The optical filter of claim 8, wherein the hydrogenated germanium film is associated with a refractive index of less than 4.6 at the spectral range with the center wavelength of approximately 1550 nm.

17. The optical filter of claim 8, wherein the one or more second layers include one or more of:
  a silicon dioxide (SiO2) material,
  an aluminum oxide (Al2O3) material,
  a titanium dioxide (TiO2) material,
  a niobium pentoxide (Nb2O5) material,
  a tantalum pentoxide (Ta2O5) material, or
  a magnesium fluoride (MgF2) material.

18. An optical filter, comprising:
  a first set of layers comprising:
    a non-hydrogenated germanium film;
    one or more hydrogenated germanium films; and
    an annealed hydrogenated germanium film; and
  a second set of layers.

19. The optical filter of claim 18, wherein the annealed hydrogenated germanium film is associated with an extinction coefficient of less than 0.0001 at a spectral range with a center wavelength of approximately 1550 nanometers (nm).

20. The optical filter of claim 18, wherein the second set of layers include one or more layers of silicon dioxide.

* * * * *